US012318335B2

(12) United States Patent
Schulte et al.

(10) Patent No.: US 12,318,335 B2
(45) Date of Patent: Jun. 3, 2025

(54) EXTENSION FOOT SLEEVE

(71) Applicant: CONDOR MEDTEC GMBH, Salzkotten (DE)

(72) Inventors: Dominik Schulte, Salzkotten (DE); Ira Fecke-Schulte, Delbrueck (DE)

(73) Assignee: Condor Medtec GmbH, Salzkotten (DE)

(*) Notice: Subject to any disclaimer, the term of this patent is extended or adjusted under 35 U.S.C. 154(b) by 579 days.

(21) Appl. No.: 17/053,451

(22) PCT Filed: Feb. 21, 2019

(86) PCT No.: PCT/DE2019/100166
§ 371 (c)(1),
(2) Date: Nov. 6, 2020

(87) PCT Pub. No.: WO2019/214764
PCT Pub. Date: Nov. 14, 2019

(65) Prior Publication Data
US 2021/0220203 A1 Jul. 22, 2021

(30) Foreign Application Priority Data
May 7, 2018 (DE) ..................... 10 2018 110 900.8

(51) Int. Cl.
*A61G 13/00* (2006.01)
*A61G 13/12* (2006.01)

(52) U.S. Cl.
CPC ....... *A61G 13/125* (2013.01); *A61G 13/0036* (2013.01)

(58) Field of Classification Search
CPC ... A44B 11/12; A44B 11/125; Y10T 24/4016; A43B 5/04; A43B 5/0401; A43B 5/0476;
(Continued)

(56) References Cited

U.S. PATENT DOCUMENTS 3,580,248 A * 5/1971 Larson ................ A61F 5/05816 128/DIG. 20
5,645,079 A * 7/1997 Zahiri .................. A61F 5/3769 5/624

(Continued)

FOREIGN PATENT DOCUMENTS

DE 202010010363 U1 11/2010
EP 2363100 A1 9/2011
GB 2276549 A 10/1994

*Primary Examiner* — Adam Baker

(74) *Attorney, Agent, or Firm* — Laurence A. Greenberg; Werner H. Stemer; Ralph E. Locher

(57) ABSTRACT

An extension foot sleeve is formed with an L-shaped foot-receiving shell having an external adapter block for arranging on an operating table and having quick-release clasps and detent tabs for securing a patient's foot. The foot sleeve makes it possible to easily clamp a patient's foot without turning it in the L-shaped foot-receiving shell and without moving cushioning material laterally, and also reliably prevents an accidental release of the quick-release clasps or undesirable contact between the operating team and same. The quick-release clasps are arranged in pairs to the right and left on side edges of the foot-receiving shell in an edge region of the L angle close to the heel and in an edge region of the upper end of the foot-receiving shell. The extension foot sleeve is associated with clamps having detent tabs on both sides, which can be inserted in parallel into the quick-release clasps.

12 Claims, 2 Drawing Sheets

(58) Field of Classification Search

CPC ....... A43B 5/0433; A43B 5/045; A43B 11/00; A61F 5/04; A61F 5/042; A61F 5/3761; A61F 5/0111; A61F 5/0113; A61F 5/0116; A61F 5/0127; A61F 5/0195; A61F 5/0123; A61F 5/05; A61F 5/0585; A61F 5/14; A61G 7/1098; A61G 13/125; A63C 10/06; A63C 10/04

USPC ........................................................ 128/845

See application file for complete search history.

(56) References Cited

U.S. PATENT DOCUMENTS

| | | | | |
|---|---|---|---|---|
| 8,944,065 | B2 * | 2/2015 | Slusarz, Jr. | A61F 5/0116 128/845 |
| 9,241,542 | B2 * | 1/2016 | Kuo | A63B 33/004 |
| 2001/0013157 | A1 * | 8/2001 | Giancarlo | A43B 1/0027 24/71 SK |
| 2002/0026135 | A1 * | 2/2002 | Lowe | A61F 5/0585 602/5 |
| 2008/0306458 | A1 * | 12/2008 | Chandrasekar | A61G 13/12 128/846 |
| 2009/0287128 | A1 * | 11/2009 | Ingimundarson | A61F 5/0102 602/27 |
| 2010/0094186 | A1 * | 4/2010 | Brown | A61F 5/0111 602/16 |
| 2011/0099846 | A1 * | 5/2011 | Fischer | A43C 11/146 36/117.1 |
| 2011/0197362 | A1 * | 8/2011 | Chella | A61F 5/3761 5/650 |
| 2012/0305005 | A1 * | 12/2012 | Keith-Lucas | A61G 13/0081 128/845 |
| 2014/0210187 | A1 * | 7/2014 | Ritter | A63C 9/02 280/611 |
| 2016/0045354 | A1 * | 2/2016 | Lee | A61F 5/0195 602/23 |
| 2016/0287238 | A1 * | 10/2016 | DeMayo | A61G 13/101 |
| 2019/0116924 | A1 * | 4/2019 | Darby | A43B 13/36 |

* cited by examiner

EXTENSION FOOT SLEEVE

BACKGROUND OF THE INVENTION

Field of the Invention

The invention relates to an extension foot sleeve formed from an L-shaped foot-receiving shell having an external adapter block close to the heel, for arrangement on an operating table, according to the preamble of the main claim.

An extension foot sleeve is known (DE 20 2010 010 363 U1) which has quick-release clasps and latching tabs for securing a patient's foot, but in which the latching tabs are integrally formed at the ends of belt anchors which are secured on a side of the foot-receiving shell, such that, when a patient's foot is clamped in place, it can happen that said foot is subjected to undesired lateral forces in the foot-receiving shell of the extension foot sleeve, which lateral forces can have a negative effect as regards optimal fixing of the foot. A disadvantage of the known extension foot sleeves is moreover that the position of the quick-release clasps is on the shin or instep, such that, during an operation, there is a danger of a member of the operating team accidentally touching the quick-release clasps or even inadvertently releasing them, with the result that a patient's foot can come loose from the extension foot sleeve in an uncontrolled manner, which may have undesirable consequences as regards the course of the operation.

SUMMARY OF THE INVENTION

The object of the invention is to make available a novel type of extension foot sleeve which permits simple clamping of a patient's foot, without turning the latter in the L-shaped foot-receiving shell or causing lateral movement of padding material, and also to reliably prevent accidental release of the quick-release clasps or unwanted contact between the operating team and same.

In connection with the features of the preamble of the first patent claim, this object is achieved, according to the invention, by the technical features of the characterizing part of the claim, specifically in that quick-release clasps are arranged in pairs to the right and left on both sides of the side edges of the foot-receiving shell in an edge region of the L angle close to the heel and in an edge region of the upper end of the foot-receiving shell close to the calf, and in that the extension foot sleeve is assigned clamping brackets having latching tabs on both sides, which latching tabs can be inserted in parallel into the quick-release clasps and can be latched therein.

By virtue of the possibility of pushing the latching tabs into the quick-release clasps simultaneously and in parallel, it is possible to effectively prevent a situation where a patient's foot that is to be clamped is turned in the foot-receiving shell or where underlying padding material slips out of place and can cause pressure folds. By virtue of the fact that the quick-release clasps are arranged laterally to the left and right of the L-shaped foot-receiving shell, there is also less danger of an unwanted release of the tension levers during an operation, in addition to which an extension foot sleeve according to the invention can be used for a left or a right foot of a patient, so that there is no need to keep a stock of different extension foot sleeves.

Further advantageous embodiments of the subject matter of the invention derive from and in combination with the dependent claims.

According to a particularly preferred embodiment of the invention, base blocks for securing the quick-release clasps in one piece on the foot-receiving shell are formed integrally on the foot-receiving shell in the region of the quick-release clasps, such that the foot-receiving shell has sufficient strength at the location where forces are introduced into the foot-receiving shell, without there being a danger of possible fastening screws being torn out from the material.

Advantageously, the quick-release clasps are each arranged with angle adjustability on the foot-receiving shell by fastening means that are guided by a pivot axis through the base blocks and the foot-receiving shell, such that it is possible to adapt the clamping brackets optimally to a patient's foot that is to be clamped, without generating additional tensile loads.

Pivotable quick-release clasps of this kind are preferably equipped with latching lugs directed toward the foot-receiving shell, which latching lugs engage in latching recesses in or on the foot-receiving shell, wherein these latching recesses either correspond to the width of the latching lugs, such that an angle adjustment is almost excluded, or the latching recess is formed as a part-circle recess which is longer than a latching lug is wide, such that a defined pivoting angle of the clamping brackets is possible but a clamping bracket is prevented from accidentally pivoting out from the permissible pivoting range or from pivoting automatically, and therefore incorrect operation of the extension foot sleeve can be substantially ruled out.

According to a very particularly advantageous embodiment of the invention, the foot-receiving shell is produced in one piece with the base blocks for the quick-release clasps, and with a base block for the adapter block, by a 3D printing method, wherein these printing methods make it possible to produce different sizes of extension foot sleeves in a short time, such that different sizes of extension foot sleeves can be made available quickly and economically, without carefully hand-laminated carbon fiber receiving shells according to the prior art having to be padded in order to make them smaller, for example. A further important advantage of this production method lies in the absolute dimensional accuracy and the easy reproducibility of the created product, such that, for example, functional components to be arranged on the L-shaped foot-receiving shell no longer have to be adapted individually.

The latching tabs are advantageously arranged at the two free ends of a U-shaped clamping bracket, wherein each clamping bracket has a connection tab between the latching tabs, which connection tab is designed as an ergonomically widened contact face, such that the tensile forces generated by the quick-release clasps can be applied to a patient's foot as holding forces over a large area.

An illustrative embodiment of the invention is described in more detail below with reference to the drawings.

DETAILED DESCRIPTION OF THE INVENTION

Figure 1:
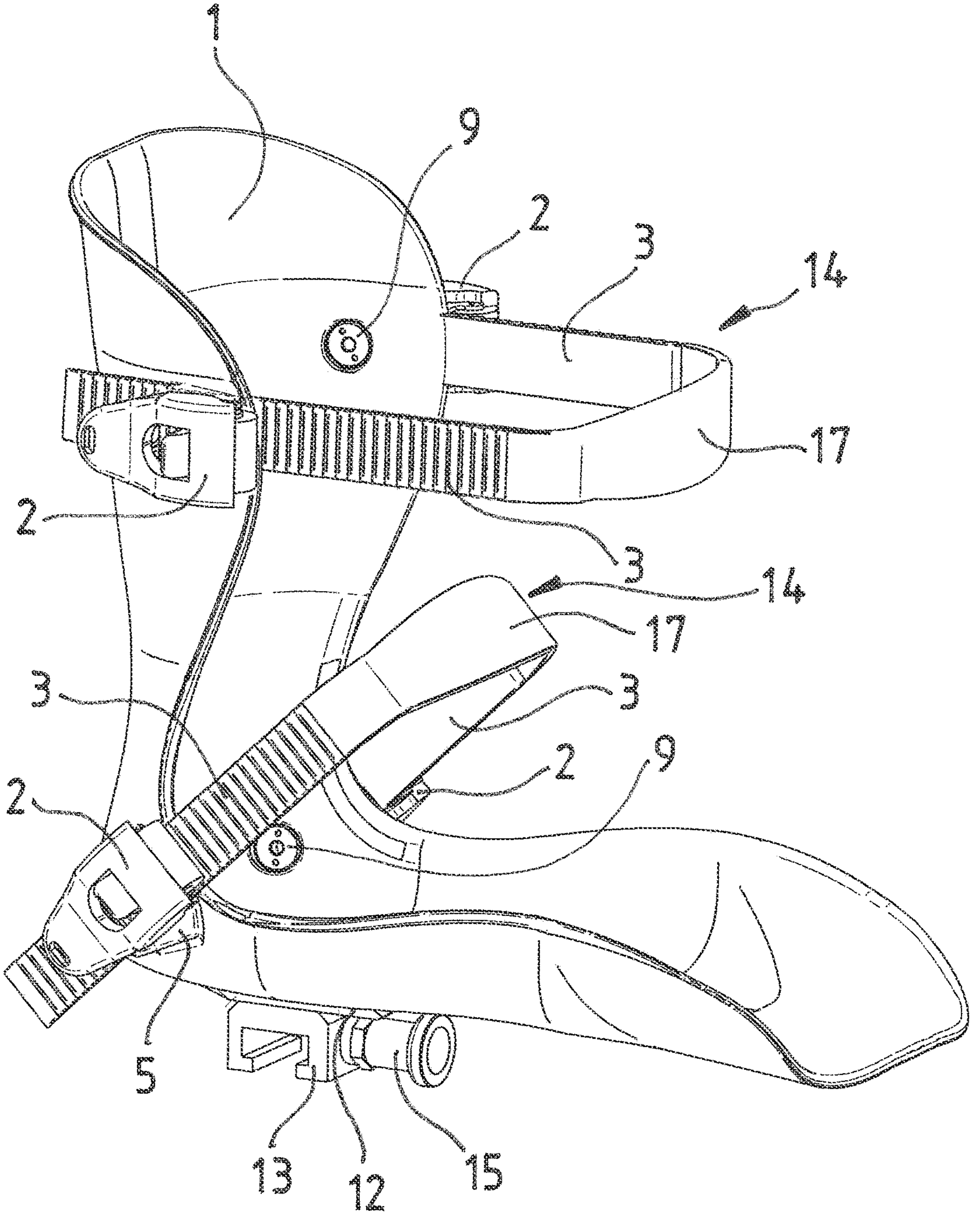
FIG. 1 shows a three-dimensional view of an extension foot sleeve.
Figure 2:
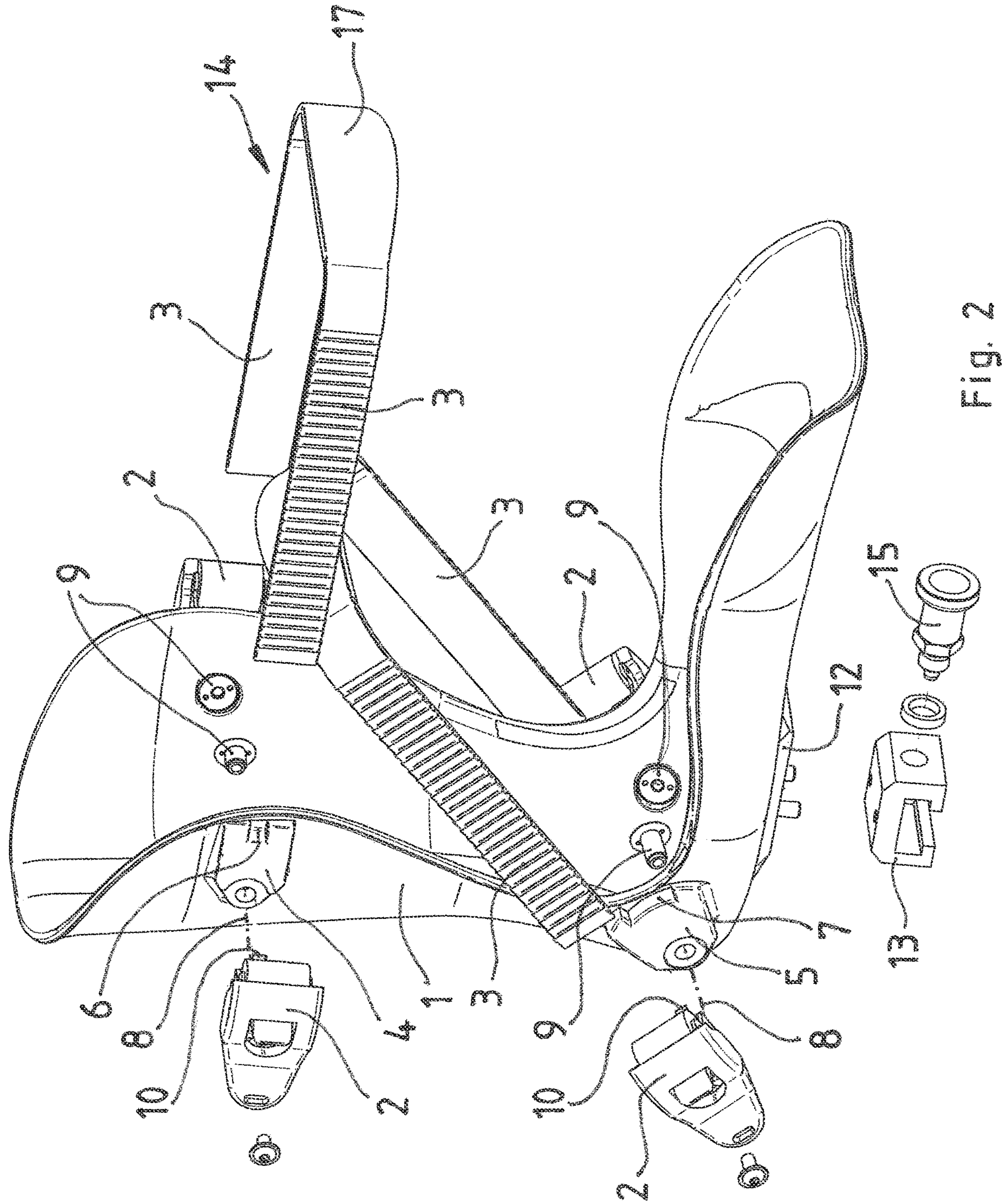
FIG. 2 shows an exploded view of the extension foot sleeve from FIG. 1.

The extension foot sleeve is formed from an L-shaped foot-receiving shell 1 having an adapter block 13 close to the heel, for arrangement on an operating table, and having quick-release clasps 2 and latching tabs 3, wherein the latching tabs 3 are arranged at the free ends of U-shaped clamping brackets 14, which have a connection tab 17 between the latching tabs 3, which connection tab 17 has an ergonomically widened contact face in relation to the width of the latching tabs 3.

On both sides of the foot-receiving shell 1, base blocks 5 are formed integrally on the material of the foot-receiving shell 1 in the region near the heel or in the angle region of the L-shaped foot-receiving shell 1, and base blocks 4 are formed integrally on the material of the foot-receiving shell 1 in the lower calf region, which blocks are provided for the arrangement of the quick-release clasps 2 and have a through-opening via which a fastening means in the form of a spacer sleeve nut 9 can be inserted, with which the quick-release clasps 2 can be secured firmly or adjustably in terms of their angle.

The upper base block 4 has a narrow latching recess 6 into which a latching lug 10 of the quick-release clasp 2 extends, such that the latter is substantially limited in terms of its angular movement, whereas the base block 5 in the heel region of the foot-receiving shell 1 has an elongate latching recess 7 which is directed about the pivot axis 8 and which is very much wider than the latching lug 10 of the associated quick-release clasp 2, such that the latter can be pivoted about the pivot axis 8 in a defined angle range.

To secure a patient's foot, the clamping brackets 14 can first of all be pushed into the openings of the quick-release claps 2, whereupon the closure of the tension levers of the quick-release clasps 2 has the effect that the latching tabs 3 of the clamping brackets 14 are pulled still tighter against a patient's foot, wherein the tension levers can advantageously also have an additional ratchet function.

A base block 12 for the arrangement of an adapter block 13 on the foot-receiving shell 1 is integrally formed under the heel region of the foot-receiving shell 1, having an unlocking knob 15 for the manual assembly and disassembly of the extension foot sleeve on an operating table.

The invention claimed is:

1. An extension foot sleeve, comprising:

an L-shaped foot-receiving shell having side edges and an external adapter block disposed close to a heel, for arrangement on an operating table;

latching tabs for securing a foot of a patient;

quick-release clasps disposed in pairs on both a left-side and a right-side of said side edges of said L-shaped foot-receiving shell in a first edge region of a L angle of said L-shaped foot-receiving shell close to the heel and in a second edge region at an upper end of said L-shaped foot-receiving shell for receiving a calf; and U-shaped clamping brackets, a latching tab of said latching tabs being arranged at each free end of both sides of said U-shaped clamping brackets, said latching tabs being insertable in parallel into said quick-release clasps and locked therein, said U-shaped clamping brackets configured to be inserted into said quick-release clasps and moved posteriorly without applying lateral forces to the foot of the patient.

2. The extension foot sleeve according to claim 1, further comprising base blocks for securing said quick-release clasps in one piece to said L-shaped foot-receiving shell, said base blocks are formed integrally on said L-shaped foot-receiving shell in a region of said quick-release clasps.

3. The extension foot sleeve according to claim 2, wherein said L-shaped foot-receiving shell is produced in one piece with said base blocks for said quick-release clasps and with a further base block for said external adapter block, by a 3D printing method.

4. The extension foot sleeve according to claim 1, wherein said quick-release clasps have fastening means and said quick-release clasps are each disposed with angle adjustability on said L-shaped foot-receiving shell by said fastening means that are guided by a pivot axis.

5. The extension foot sleeve according to claim 1, wherein:

said L-shaped foot-receiving shell has latching recesses formed therein; and said quick-release clasps each have latching lugs directed toward said L-shaped foot-receiving shell, said latching lugs engage in said latching recesses in or on said L-shaped foot-receiving shell, said latching recesses either correspond to a width of said latching lugs or are configured as part-circle recesses which are longer than said latching lugs are wide.

6. The extension foot sleeve according to claim 1, wherein each of said clamping brackets has a connection tab between said latching tabs, said connection tab is configured as an ergonomically widened contact face.

7. The extension foot sleeve according to claim 1, wherein said quick release clasps have tension levers for engaging said latching tabs.

8. The extension foot sleeve according to claim 7, wherein said latching tabs are configured to have a ratchet function on said latching tabs.

9. The extension foot sleeve according to claim 1, wherein said latching tabs are configured to be inserted into said quick-release clasps and moved posteriorly and locked into said quick-release clasps without applying lateral forces to the foot of the patient.

10. An extension foot sleeve, comprising:

an L-shaped foot-receiving shell having side edges and an external adapter block disposed close to a heel, for arrangement on an operating table;

quick-release clasps disposed in pairs on a left-side and a right-side of said side edges of said L-shaped foot-receiving shell, a first pair of said pairs being disposed at a first edge region of a L angle of said L-shaped foot-receiving shell at the heel and a second pair disposed at a second edge region at an upper end of said L-shaped foot-receiving shell for receiving a calf; and U-shaped clamping brackets each having latching tabs at each free end of said U-shaped clamping brackets, said latching tabs being insertable in parallel into said quick-release clasps by displacement along an axial direction of said latching tabs for engaging with and locking into said quick release clasps.

11. The extension foot sleeve according to claim 10, wherein said quick release clasps have tension levers for engaging said latching tabs.

12. The extension foot sleeve according to claim 10, wherein said latching tabs are configured to have a ratchet function on said latching tabs.

* * * * *